United States Patent [19]
Angle et al.

[11] 3,833,347
[45] Sept. 3, 1974

[54] METHOD FOR MOLDING GLASS LENSES

[75] Inventors: Milton A. Angle; Gerald E. Blair; Clarence C. Maier, all of Rochester, N.Y.

[73] Assignee: Eastman Kodak Company, Rochester, N.Y.

[22] Filed: Mar. 12, 1973

[21] Appl. No.: 340,139

Related U.S. Application Data

[63] Continuation of Ser. No. 93,351, Nov. 27, 1970, abandoned.

[52] U.S. Cl................ 65/32, 65/68, 65/72, 65/76, 65/77, 65/374
[51] Int. Cl.................. C03b , C03b 9/14
[58] Field of Search ....... 65/32, 374, 25 A, 39, 223, 65/77, 68, 72, 79, 69

[56] References Cited
UNITED STATES PATENTS

| | | | |
|---|---|---|---|
| 1,229,324 | 6/1917 | Rosenblum | 65/32 |
| 2,395,727 | 2/1946 | Devol | 65/182 A |
| 2,478,090 | 8/1949 | Devol | 65/25 A |
| 3,103,428 | 9/1963 | Stello et al. | 65/32 X |
| 3,140,164 | 7/1964 | Long | 65/32 X |
| 3,152,384 | 10/1964 | Todaig et al. | 65/32 X |
| 3,306,723 | 2/1967 | Forber | 65/223 X |
| 3,372,017 | 3/1968 | Pitbladbu | 65/182 |
| 3,416,907 | 12/1968 | Carnall, Jr. et al. | 65/32 |
| 3,451,794 | 6/1969 | Patterson | 65/32 X |
| 3,457,054 | 7/1969 | Pei | 65/32 X |
| 3,534,803 | 10/1970 | Bickerdike | 65/374 X |
| 3,589,880 | 6/1971 | Claric | 65/32 X |
| 3,725,023 | 4/1973 | Parris | 65/32 |

*Primary Examiner*—Frank W. Miga
*Attorney, Agent, or Firm*—R. F. Brothers

[57] ABSTRACT

A method for molding glass into finished, image-forming lenses wherein a portion of optical glass is placed in a mold cavity formed of a glasslike carbon material and subjected to heat and pressure. The walls defining the mold cavity have a high surface quality and a high surface accuracy, and the cavity is configured to produce lenses of predetermined shapes.

27 Claims, 4 Drawing Figures

PATENTED SEP 3 1974

3,833,347

GERALD E. BLAIR
CLARENCE C. MAIER
MILTON A. ANGLE
INVENTORS

BY D. Peter Hochberg
R. W. Hampton
ATTORNEYS

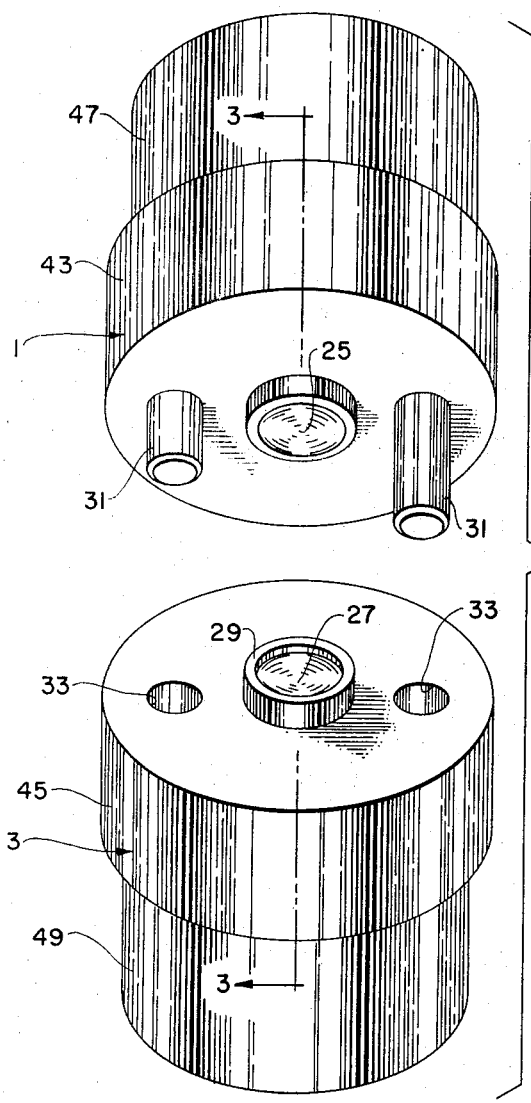
FIG. 2
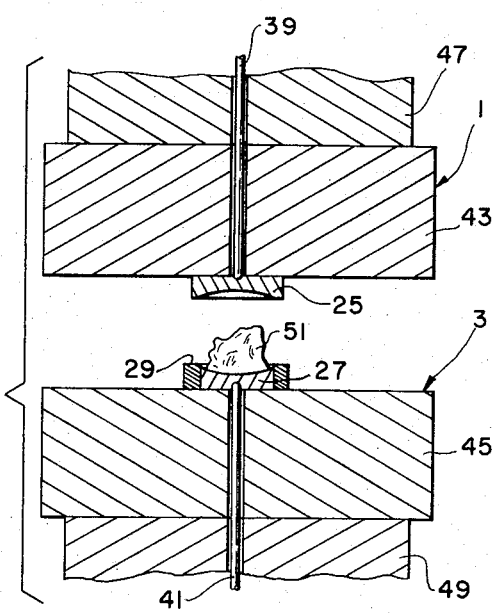
FIG. 3a
FIG. 3b
GERALD E. BLAIR
CLARENCE C. MAIER
MILTON A. ANGLE
INVENTORS
BY
ATTORNEYS

METHOD FOR MOLDING GLASS LENSES

CROSS REFERENCE TO RELATED APPLICATION

This is a continuation of U.S. Application Ser. No. 93,351, filed Nov. 27, 1970, now abandoned.

Reference is made to commonly assigned copending U.S. Application Ser. No. 340,510 filed on even date herewith in the names of Gerald E. Blair, Clarence C. Maier and William F. Parsons which application is a continuation of U.S. Application Ser. No. 93,336 filed Nov. 27, 1970 now abandoned and to commonly assigned copending U.S. Application Ser. No. 307,254 filed on Nov. 16, 1972 in the names of M. A. Angle, G. L. Bender, G. E. Blair and C. C. Maier.

BACKGROUND OF THE INVENTION

1. Field of the Invention

This invention relates to the manufacture of glass lenses, and in particular to the molding of glass into finished lens elements.

2. Description of the Prior Art

The manufacture of optical lens elements has long involved resort to painstaking procedures which are complex, slow, and expensive. Despite diligent efforts within the lens making industry to improve existing methods of lens manufacture, the conventional methods require many separate operations. According to one such method, a rough molded glass blank is first made by heating a weighed chunk of glass to a plastic state and pressing the glass to the desired shape in a metal mold. The blank is necessarily larger than the intended finished lens element to allow for the removal of material, since the outer layers of the lens blank are often of low quality. The lens is preliminarily shaped by a grinding wheel having an abrasive surface with diamond chips. Spherical lens surfaces are generated by rotating the blank in a vacuum chuck and grinding the blank with a rotating annular wheel whose axis is at an angle to the chuck axis. The geometry of this arrangement causes a sphere to be generated wherein the radius is determined by the angle between the axes of the chuck and of the rotating generating tool, and by the effective diameter of the tool. The thickness is governed by the distance the work is advanced into the tool. The production of non-spherical lens surfaces involves a different, more complicated process, which will be described below.

It is customary to process optical elements in multiples by fastening or "blocking" a suitable number of lens blanks on a common support. The reasons for this are to reduce costs, and because better surface results are achieved when the processing is averaged over a larger area represented by a number of pieces. The blanks are fastened to the blocking tool with a pitch which adheres to the blanks. Usually, pitch buttons are molded to the back of the warmed lens blanks and then stuck to the heated blocking tool. The surface of the lens blank is refined by a series of grinding operations performed with loose abrasive in a water slurry and cast iron grinding tools. If the elements have not been generated, they are initially ground with a course, fast-cutting emery. Otherwise, grinding commences with a medium grade and proceeds to a very fine grade which imparts a smooth, velvety surface to the glass. Each successively finer grade of emery is used until the grinding pits left by the preceding grade are ground out.

After the grinding operation has been concluded, the lens element is polished by a process similar to the grinding process. The polishing tool is lined with a layer of pitch and the polishing compound is a slurry of water and rouge (iron-oxide) or cerium oxide. Polishing is continued until all of the grinding pits and scratches are removed from the surface of the lens. Then, the lens shape is checked and corrections are made to assure the proper shaping of the lens.

Following the polishing operation, the lens is centered by grinding the rim of the lens, so that its mechanical axis (defined by the edge of the lens) coincides with the optical axis (the line between the centers of curvature of the two lens surfaces). Lens centering can be done either by a known visual method which is very accurate or by a more economical mechanical method.

As indicated above, it is considerably more complicated to produce non-spherical lens surfaces. The manufacture of precise aspheric lens surfaces requires a combination of exacting measurement and skilled hand correction. One method involves the difficult operation of working a lens blank between centers on a lathe. Aspheric lenses can be made in small production quantities, where high precision is not required, by means of a cam guided grinding rig for generating the lens surface. Thereafter, the troublesome operations of grinding and polishing the aspheric lens surface are performed, the problem being that these operations can easily destroy the basic shape of the lens. Where precise aspheric surfaces are required, it is necessary to make grinding adjustments manually with the concomitant requirements of great delicacy and finesse, the shortcomings of which are apparent.

The expense of existing methods for fabricating glass lenses has led to the limited use of plastic lenses. Plastic has several advantages as a lens material, namely it is light, shatterproof and moldable. However, presently available plastics which are practical for use as lens materials such as polystyrene, polycyclohexyl methacrylate, and polymethyl methacrylate, are relatively soft and scratch easily. Moreover, the latter plastic tends to be frequently hazy and sometimes yellowish. Also, plastics usually soften within the range of 60° to 80° C and their indices of refraction may change in time. Most plastics absorb water and are subject to change dimensionally, the latter characteristic being due to their tendency to cold flow under pressure and to their high thermal expansion coefficient which is almost ten times that of glass. In addition, the high thermal expansion of the plastics causes changes in the indices of refraction of the plastics to an extent ten times that of glass thus severely hampering the optical performance of the lens.

Thus, glass is clearly a more desirable lens material than plastic, but plastic lenses are considerably easier and cheaper to manufacture than glass lenses because they can be mass produced by molding. However, existing molding methods have not been suitable for the molding of finished glass lenses because of the physical characteristics of glass and its tendency to adhere to some materials. U.S. Pat. No. 2,410,616 teaches a machine for molding glass lenses which has an accurate "spectacle finish" on their surfaces, such a finish being defined as one resembling and closely approaching the finish of spectacles, and which therefore always require finishing by grinding and polishing operations. Optical glass has been found to accurately replicate the surfaces of those mold materials to which it does not adhere, and this tendency has heretofore made all of the latter known mold materials unacceptable for the molding of glass lenses. For example, glass molded in metal dies has been found to reproduce the grain structure of the mold material on the surface of the glass, and therefore such lenses have been found to be unsuitable for use in photographic apparatus. Thus, the failure of known molding apparatus and processes to produce acceptable glass lenses has necessitated reliance on the time consuming and expensive lens production methods described above.

Recently, a new method and apparatus for molding glass has been discovered, which is disclosed in copending Application Ser. No. 93,336. It has been found that certain materials, referred to in Ser. No. 93,336 as glasslike carbons, can be polished to a glassy finish to which softened or molten glass will not permanently adhere. It has further been found, and disclosed in Ser. No. 93,336, that a mold cavity can be formed of glasslike carbon which is configured to yield a finished lens of a predetermined shape and which is defined by walls having a surface quality and a surface accuracy comparable to that of a finished lens. Finally, it has been found, and disclosed in Ser. No. 93,336, that a heat-softened optical glass can be molded into a finished optical lens by applying appropriate amounts of heat and pressure to the glass contained within the mold cavity. While the invention disclosed in Ser. No. 93,336 represents a significant breakthrough in the art of lens fabrication, it suggests molding using a cane of glass which is heated outside the mold and then placed in the mold cavity. Such a method requires molding apparatus which is constructed to permit insertion of the heated glass cane and further presents a risk of contamination of the heated glass surface prior to molding, which may render the molded element unusable and may damage the molding surfaces. Moreover, the glass cane must be substantially deformed during the molding operation to produce the finished glass lens.

SUMMARY OF THE INVENTION

Accordingly, an object of the present invention is to manufacture optical elements in an improved and economic manner.

An object of the present invention is to manufacture glass lenses in an improved and economical manner.

Another object is to manufacture image forming glass lenses with surfaces having high quality and high accuracy.

A still further object is to provide an improved method for molding glass into optical elements.

A more specific object is to provide an improved method for molding glass into lenses.

A further object is to provide an improved method for molding glass into lenses suitable for use in photographic apparatus.

Other objects will be apparent to those skilled in the art from the description to follow and from the appended claims.

The above objects are achieved according to this invention by molding glass into lenses of predetermined shapes in a mold made of glasslike carbon. The mold cavity is defined by surfaces which are of a high quality and a high accuracy comparable to that of a finished, image-forming lens. In one embodiment of the present invention, the molding process comprises the steps of placing a portion of optical glass in such a glasslike carbon mold, heating the mold to soften the glass, closing the mold members until the glass in the mold cavity conforms to the shape of the cavity, and removing the finished lens from the mold. The mold and the glass are subjected to various temperatures and pressures in order to produce the desired glass lens.

According to a preferred embodiment of the invention, a glasslike carbon mold of the aforementioned type is located in an appropriate chamber, and the process is followed of: inserting a glass gob in the cavity of the mold, evacuating the chamber, outgassing the mold assembly at a relatively low temperature, controlling the atmosphere of the chamber so that it is nonoxidizing, heat softening the glass gob by increasing the temperature of the mold, applying pressure to the mold, cooling the mold to bring the glass to a temperature below the glass transformation point, removing the pressure from the mold, further lowering the temperature of the mold and removing the finished lens.

BRIEF DESCRIPTION OF THE DRAWINGS

In the preferred embodiments of the invention described below, reference is made to the accompanying drawings, in which:

FIG. 2 is a detailed view of the mold employed in the apparatus shown in FIG. 1; and FIGS. 3A and 3B are partial cross-sectional views taken through the line 3—3 in FIG. 2 during different stages of the operation of the mold.

DETAILED DESCRIPTION OF THE PREFERRED EMBODIMENTS

Figure 1:
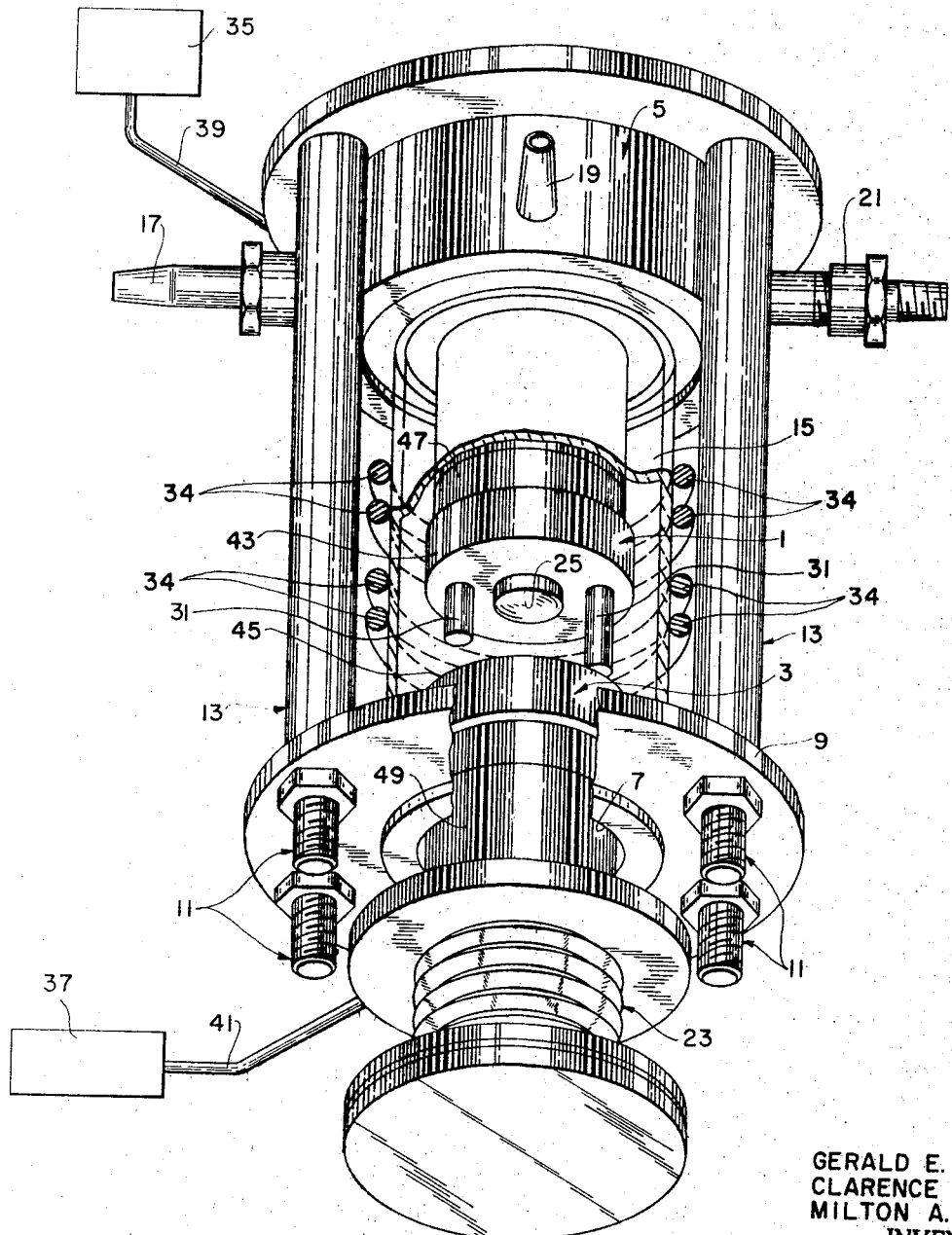
FIG. 1 is a perspective, partially cut away view of a molding apparatus for producing glass lenses according to the invention.

In order for a glass lens to be incorporated in a photographic apparatus or in any optical system requiring good image forming qualities, the lens must meet certain criteria. These criteria are very strict, which is the reason that the existing carefully controlled lens fabricating processes are used. Some of these criteria relate to the nature of the glass itself and are not of interest here. What is of interest here is the nature of the surface of the lens. The lens surface is selected by the lens designer for a particular purpose, and not only must the parameters defining the lens shape be carefully conformed to, but the lens surface itself must be carefully controlled. The major characteristics of an optical surface are known in the art as surface quality and surface accuracy. Surface quality refers to the finish of the lens and includes such defects as scratches, digs, pits, "orange peel", and the like. Surface accuracy, which is usually specified in terms of the wave length of light of a specific color, refers to the dimensional characteristics of the surface, i.e. the value and uniformity of the radius of curvature of the surface. The surface accuracy is generally determined by an interferometric comparison of the lens surface with a test plate gauge, by counting the number of Newton's rings, and examining the regularity of the rings. The surface accuracy of a lens is often referred to as its fit. The fit of a lens is expressed in terms of its power (the number of Newton's rings which are counted) and its irregularity (the difference between the number of rings when counted in perpendicular directions across the fringe pattern). The lower the power and irregularity, the better the lens. The quality of the surface of a lens which is to be used in an optical system of the type used in photographic apparatus or equivalent apparatus must be high, and the term "high surface quality" is used herein to refer to a finished lens for such use. A lens having a "high surface quality" would therefore not normally require any subsequent grinding or finishing operations. Similarly, a lens having "high surface accuracy" or a "precise fit" is one which has dimensional characteristics which are extremely close to their design value and are very uniform. The surface accuracy of a lens used in many applications in photographic apparatus is considered high when it has a power of less than 6 rings and an irregularity of less than 3 rings.

As stated previously, a factor severely impairing the development of a process for molding finished glass lenses is the tendency of molten or softened optical glass to either adhere to certain materials or to accurately replicate the surface structure of mold materials. Recently, glasslike carbon materials were developed for use as sheathing in nuclear reactors and these materials have since found many applications in the electronics and metallurgy fields. A new use for glasslike carbon has been discovered and is disclosed in copending Application Ser. No. 93,336. We have discovered improved methods and apparatus for the utilization of glasslike carbon in the optical field. It has been found that these materials can be polished to a glassy finish to which softened or molten glass will not permanently adhere. This new group of carbons has been given the generic term "glasslike" because they exhibit a glassy surface appearance, conchoidal fracture, internal-friction characteristics resembling glass more closely than normal graphite, and gas impermeability comparable to that of glass. Examples of such a material are known under a variety of names such as the following: glassy carbon, vitreous carbon, LMSC glassy carbon, carbone vitreux, vitro carbon and cellulose carbon. Glasslike carbon is prepared by the thermal degradation of organic polymers, and has a crystal structure with a maximum crystal size which is often about 20 A. Glasslike carbon is extremely chemically inert and it is isotropic. Further description of the chemical and physical properties of glasslike carbon as well as specific methods for preparing such a material are disclosed in U.S. Pat. Nos. 3,446,593 and 3,109,712 and in Shigehiko Yamada, *A Review of Glasslike Carbons*, Defense Ceramic Information Center (DCIC) Report 68-2, Ohio, Battelle Mem. Inst., 1968. Since there are no detectable crystal lattices or grain boundaries, it is possible to give the material the highly polished, specular surface referred to above. The replication of such a surface by glass has been found to leave the glass with a high surface quality. The term glasslike carbon is used herein to describe a material which, while it may exhibit all of the characteristics described in this paragraph, exhibits at least the following characteristics: prepared by the thermal degradation of an organic polymer, substantially chemically inert with heated glass and isotropic.

The present invention provides a practicable method for molding finished glass lenses. The molding process requires a glasslike carbon mold having a mold cavity which is configured to yield a finished lens of a predetermined shape and which is defined by walls having a surface quality and a surface accuracy comparable to that of the finished lens. The mold can comprise, for example, a pair of separable mold members having opposing walls which cooperatively define a mold cavity when the mold members are in their closed positions. The walls defining the cavity are shaped much like the predetermined shape of the lens to be produced by the mold, but provisions may have to be made for dimensional changes occurring in the molded glass lens resulting from temperature changes and the like during and after the molding process.

Since heat softened or molten glass replicates surfaces with which it becomes in intimate contact, the surfaces of the cavity-defining walls must be rendered extremely smooth and dimensionally accurate. This can be accomplished by grinding and polishing these walls until they reach the tolerance limits established for the intended lens. As indicated previously, the surface accuracy of lenses of the quality used in photographic apparatus should frequently be within 6 Newton rings of power. Surface accuracy to well within this degree has been achieved in the walls defining the cavities of glasslike carbon molds. Likewise, these same mold walls must have a "high surface quality" to the degree mentioned previously, which renders them substantially devoid of scratches, digs, pits, and the like. The glasslike carbon molds are preferably installed as inserts on sturdy support members in order to add strength and durability to the molds.

The process of molding the glass lenses basically comprises placing a portion of glass in the cavity of the glasslike carbon mold, softening the glass by heating the mold, applying appropriate amounts of heat and pressure to the mold while maintaining a non-oxidizing atmosphere in the mold vicinity, cooling and opening the mold, and removing the finished lens.

A molding apparatus with which the molding processes of the present invention can be practiced is shown in FIG. 1. The apparatus comprises a stationary upper mold assembly 1 and a lower mold assembly 3. Upper mold assembly 1 is fixed in an upper mount 5 whereas lower mold assembly 3 is vertically movable through a circular aperture 7 provided in a base plate 9. Upper mount 5 and base plate 9 are conneected by a set of bolts 11 which extend through a set of tubes 13. A molding chamber is defined by a borosilicate glass (such as Pyrex) envelope 15 which has a cylindrical shape and which encloses the molding space located between the upper and lower mold assemblies. A port 17 (which can be closed by a valve which is not shown) is connected to the chamber defined by envelope 15 for exhausting gas from the chamber; a second port 19 is similarly connected to the chamber for admitting forming gas to the chamber; and a third port 21 is also connected to the chamber and serves as an exhaust for the forming gas, there being provided a check valve (not shown) for regulating the exhaust to thereby control the pressure of the forming gas in the chamber. A bellows 23 is disposed beneath lower mold assembly 3, and its interior is connected to the chamber defined by envelope 15. The purpose of the bellows is to permit movement of lower mold assembly 3 upwardly while maintaining atmosphere control in the chamber.

Referring specifically to FIG. 2, upper mold assembly 1 has disposed on the lower face thereof a glasslike carbon mold member comprising an insert 25 which is configured to provide the proper shape of the part of the lens to be produced thereby. A similar mold member in the form of an insert 27 is disposed opposite to insert 25 and is mounted on the upper face of lower mold assembly 3. The opposing surfaces of the two glasslike carbon mold inserts cooperate to form the opposite faces of the lens to be produced by the mold. A ring-like portion 29 is disposed around element 27 for adding the necessary thickness to the lens to be reproduced. The mold forming surfaces are thus made of glasslike carbon, they are finished to have a high surface accuracy and shaped to produce the intended lens, and they are polished to a high quality comparable to that of the intended lens. Lower mold assembly 3 is displaceable towards upper mold assembly 1, and its path is accurately maintained by a pair of guide pins 31 which travel in appropriate inserts 33 extending into lower mold assembly 3. The pins and inserts can advantageously be made of aluminum oxide.

A heating coil 34 is wrapped around envelope 15 so as to surround the molding area. When the coils are activated, elements 25 and 27, as well as a pair of graphite supports 43 and 45 on which the respective elements 25 and 27 are mounted, are heated by induction. Heat is transmitted by conduction from supports 43 and 45, which act as heat reservoirs, to elements 25 and 27.

The mold temperature is controlled by a pair of thermocouples 35 and 37, which are connected to the glasslike carbon mold members by means of appropriate leads 39 and 41 extending through the two mold assemblies, as shown in FIGS. 3A and 3B. In order to confine the generated heat to the molding vicinity, a pair of pyrolytic insulators 47 and 49 are disposed on the sides of graphite supports 43 and 45, opposite the glasslike mold inserts. The pyrolytic graphite conducts heat in the horizontal direction (with reference to the drawings) and is non-conductive in the vertical direction. Lower mold assembly 3 can be displaced by pneumatic, hydraulic, mechanical or any other appropriate means (not shown).

The method of molding glass lenses to be described below requires a glasslike carbon mold having surfaces which are configured and finished to yield lenses having prescribed shapes and high surface qualities. It is to be understood, therefore, the mold inserts 25 and 27 are dimensioned and polished to the accuracy and quality of the lenses to be manufactured.

According to a preferred method of molding finished lenses, a preform or chunk of glass 51 is placed in the lower mold insert 27 as indicated in FIG. 3A. The chamber defined by envelope 15 is evacuated to a low pressure; the graphite supports 43 and 45, as well as the glasslike carbon mold inserts 25 and 27, are outgassed by the induction heating of the mold during the evacuation of the chamber to remove gases absorbed by the carbon; forming gas is introduced into the chamber; the mold members are heated further to increase the plasticity of the glass; a load is added to the lower mold assembly; the temperature of the mold is reduced to bring the temperature of the glass to below the glass transformation point (by keeping the temperature of the glass and of the mold substantially equal while maintaining a load on the mold, distortion of the glass is prevented as the temperature is reduced below the glass transformation point); the load is removed; the molds are further cooled to prevent oxidation of the molds and graphite; the apparatus is opened; and the finished lens is taken from the mold. If a device such as a glove box surrounds the molding apparatus, the lens can be removed as soon as the load is removed.

The foregoing process has been followed to produce very precisely finished lenses having a power of within 2 Newton's rings and an irregularity of within one Newton's ring. A specific example of conditions under which the process can be practiced is as follows:

after placing a dense barium crown optical glass in lower mold insert 27, the chamber defined by envelope 15 and bellows assembly 23 is evacuated to approximately 100 microns of pressure;

the outgassing operation is accomplished by induction heating the mold to between 200°C and 300°C during the evacuation of the chamber;

port 17 is closed and a forming gas of 95 percent nitrogen and 5 percent hydrogen is introduced into the chamber through port 19 and maintained under a slight overpressure;

the power to induction coils 34 is adjusted to raise the mold temperature to between 700°C and 800°C (which is in the region of the softening point of the glass);

the upper mold assembly is brought into close proximity with the softened glass resting on the lower mold assembly, and the preceeding temperature is maintained for one to five minutes (the glass is heated by conduction from mold insert 27 and by radiation from mold insert 25);

a load of from 10 pounds to 200 pounds is applied to lower mold assembly 3 and held for one minute to bring the glass into intimate contact with the mold cavity-defining surfaces, as shown in FIG. 3B;

the induction heating of the mold members is terminated and the mold portions are allowed to cool until a temperature of 550°–600°C is reached (this being below the 622°C transformation point of the glass);

the load on lower mold assembly 3 is removed and the temperature of the mold and glass is allowed to cool to 300°C to prevent oxidation of the glasslike carbon mold inserts and of the graphite supports; and the mold is opened and the finished lens is removed from the mold.

The preceeding method has produced very high quality lenses as indicated above, the lenses in one case having radii of curvature of 11mm. on one side and 86mm. on the other side of the lens. Lenses produced by the foregoing method have been found to be essentially strain free so that further annealing was unnecessary.

The apparatus shown in FIG. 1 for molding the lenses is not necessary for carrying out the present invention and other types of molding apparatus may be more suitable for different situations and conditions. The foregoing temperatures, pressures, and time periods will of course vary depending upon the nature of the lens and of the glass. As indicated earlier, the present invention has been found to produce image forming lenses having surfaces characterized by a high quality and a high accuracy. The method is effective both in the production of lenses having spherical surfaces and of aspheres. The invention is a significant breakthrough in the art of lens fabrication.

The invention has been described in detail with particular reference to preferred embodiments thereof but it will be understood that variations and modifications can be effected within the spirit and scope of the invention.

We claim:

1. A method of molding glass comprising the steps of:
providing a molding surface of glasslike carbon, the glasslike carbon being a form of carbon which has been prepared by the thermal degradation of an organic polymer, which is substantially chemically inert with heated glass and which is isotropic;
placing the glass in proximity to or in contact with the molding surface;
heating the glass and molding surface while they are in proximity or contact; and
pressing the glass against the molding surface.

2. A method of molding glass comprising the steps of:
providing a mold which includes a molding surface of glasslike carbon, the glasslike carbon being a form of carbon which has been prepared by the thermal degradation of an organic polymer, which is substantially chemically inert with heated glass and which is isotropic;
placing glass in proximity to or in contact with the molding surface;
heating the glass and mold while the glass and the molding surface are in proximity or contact; and
pressing the glass against the molding surface.

3. A method of molding glass into a finished lens comprising the steps of:
providing a mold which includes a surface of glasslike carbon, the glasslike carbon being a form of carbon which has been prepared by the thermal degradation of an organic polymer, which is substantially chemically inert with heated glass and which is isotropic and a surface of the glasslike carbon having been finished to provide a molding surface which is specular and which has a high surface accuracy and a high surface quality;
placing glass in proximity to or in contact with the molding surface;
heating the glass and mold while the glass and the molding surface are in proximity or contact; and
pressing the glass against the molding surface.

4. A method of molding glass comprising the steps of:
providing relatively separable mold members, at least one of the mold members including a molding surface of glasslike carbon, the glasslike carbon being a form of carbon which has been prepared by the thermal degradation of an organic polymer, which is substantially chemically inert with heated glass and which is isotropic;
placing glass in proximity to or in contact with the molding surface;
heating the glass and mold members while the glass and the molding surface are in proximity or contact; and
pressing the glass against the molding surface.

5. A method of molding glass comprising the steps of:
providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
placing glass in proximity to or in contact with at least one of the molding surfaces;
heating the mold members and glass while the glass is in proximity to or in contact with the molding surface; and
urging the mold members toward their cooperating position to press the glass against the molding surfaces.

6. A method as in claim 5 comprising also the step of moving the mold members toward their cooperating positions to an intermediate position prior to heating the mold members and glass.

7. A method as in claim 5 comprising also the step of cooling the mold members and glass while pressing the glass against the molding surfaces.

8. A method as in claim 5 comprising also the step of establishing a non-oxidizing atmosphere around the glass and the mold members prior to heating.

9. A method as in claim 5 comprising also the step of moving the mold members away from their cooperating position to permit removal of the molded glass.

10. A method of molding glass into a finished lens which comprises the steps of:
providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their cooperating position;
placing glass in proximity to or in contact with at least one of the molding surfaces;
heating the mold members and the glass while the glass is in proximity to or contact with the molding surface; and
pressing the glass against the molding surfaces.

11. A method of molding glass comprising the steps of:
providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
placing glass in proximity to or in contact with at least one of the molding surfaces;
heating the mold members and the glass while the glass is in proximity to or in contact with the molding surface;
urging the mold members toward their cooperating position to contact the glass with the molding surfaces and to press the glass into the configuration of the mold cavity; and
cooling the mold members and the glass while urging the mold members toward their cooperating position.

12. A method as in claim 11 comprising also the step of moving the mold members toward their cooperating position to an intermediate position prior to heating the mold members and glass.

13. A method as in claim 11 comprising also the step of establishing a non-oxidizing atmosphere around the glass and mold members prior to heating.

14. A method as in claim 11 comprising also the step of moving the mold members away from their cooperative position to permit removal of the molded glass.

15. A method of molding a finished glass lens comprising the steps of:
providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface accuracy and a high surface quality and which define a mold cavity when the mold members are in their cooperating position;
placing glass in proximity to or in contact with at least one of the molding surfaces;
heating the mold members and the glass while the glass is in proximity to or in contact with the molding surface;
urging the mold members toward their cooperating position to contact the glass with the molding surfaces and to press the glass into the configuration of the mold cavity; and
cooling the mold members and the glass while urging the mold members toward their cooperating position.

16. A method of molding glass comprising the steps of:
providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
placing glass in proximity to or in contact with at least one of the molding surfaces;
establishing a non-oxidizing atmosphere around the glass and mold members;
moving the mold members toward their cooperating position to bring the molding surfaces into proximity or contact with the glass; and
applying heat and pressure to the mold members to move the mold members to their cooperating position and to press the glass into the configuration of the mold cavity defined by the molding surfaces.

17. A method as in claim 16 comprising also the step of cooling the mold members and glass while maintaining pressure on the mold members.

18. A method as in claim 16 comprising also the step of moving the mold members away from their cooperating position to permit removal of the molded glass.

19. A method of molding glass into a finished lens comprising the steps of:
providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their cooperating position;
placing glass in proximity to or in contact with at least one of the molding surfaces;
establishing a non-oxidizing atmosphere around the glass and mold members;
moving the mold members toward their cooperating position to bring the molding surfaces into proximity or contact with the glass; and
applying heat and pressure to the mold members to move the mold members to their cooperating position and to press the glass into the configuration of the mold cavity defined by the molding surfaces.

20. A method of molding glass comprising the steps of:
providing mold members which are relatively movable to a cooperating position and which include molding surfaces of glasslike carbon that define a mold cavity when the mold members are in their cooperating position, the glasslike carbon being a form of carbon which has been prepared by the thermal degradation of an organic polymer, which is substantially chemically inert with heated glass and which is isotropic;
placing glass in proximity to or in contact with at least one of the molding surfaces;
moving the mold members toward their cooperating position to bring the molding surfaces into proximity or contact with the glass;
applying heat and pressure to the mold members to move the mold members to their cooperating position and to press the glass into the configuration of the mold cavity defined by the molding surfaces; and
reducing the temperature of the mold members and glass while maintaining pressure on the mold members.

21. A method as in claim 20 comprising also the step of establishing a non-oxidizing atmosphere around the mold members and glass prior to heating.

22. A method as in claim 20 comprising also the step of moving the mold members away from their cooperating position to permit removal of the molded glass.

23. A method of molding glass into a finished lens comprising the steps of:
providing mold members which are relatively movable to a cooperating position and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their cooperating position;
placing glass in proximity to or in contact with at least one of the molding surfaces;

moving the mold members toward their cooperating position to bring the molding surfaces into proximity or contact with the glass;

applying heat and pressure to the mold members to move the mold members to their cooperating position and to press the glass into the configuration of the mold cavity defined by the molding surfaces; and reducing the temperature of the mold members and glass while maintaining pressure on the mold members.

24. A method of molding glass comprising the steps of:

providing an upper mold member and a lower mold member which are relatively movable between open and closed positions and which include molding surfaces of glasslike carbon that define a mold cavity when the mold members are in their closed position, the glasslike carbon being a form of carbon which has been prepared by the thermal degradation of an organic polymer, which is substantially chemically inert with heated glass and which is isotropic;

moving the mold members to their open positions and placing glass on the molding surface of the lower mold member;

bringing the upper mold member into proximity or contact with the glass and heating the mold members and the glass to soften the glass;

moving the mold members to their closed position to bring both molding surfaces into contact with the softened glass;

applying sufficient force to the mold members to press the glass into the configuration of the mold cavity defined by the molding surfaces;

cooling the glass and mold members to reduce the temperature of the glass below its transformation temperature;

removing the force from the mold members and further cooling the glass and the mold members; and moving the mold members to their open positions to permit removal of the molded glass.

25. A method as in claim 24 comprising also the step of establishing a non-oxidizing atmosphere around the glass and mold members prior to heating.

26. A method of molding glass into a finished lens comprising the steps of:

providing upper and lower mold members which are relatively movable between open and closed positions and which include surfaces of glasslike carbon, the glasslike carbon being a form of carbon which has been prepared by the thermal degradation of an organic polymer, which is substantially chemically inert with heated glass and which is isotropic and selected surfaces of the glasslike carbon having been finished to provide molding surfaces which are specular, which have a high surface quality and a high surface accuracy and which define a mold cavity when the mold members are in their closed position;

moving the mold members to their open positions and placing glass on the molding surface of the lower mold member;

bringing the upper mold member into proximity or contact with the glass and heating the mold members and the glass to soften the glass;

moving the mold members to their closed position to bring both molding surfaces into contact with the softened glass;

applying sufficient force to the mold members to press the glass into the configuration of the mold cavity defined by the molding surfaces;

cooling the glass and mold members to reduce the temperature of the glass below its transformation temperature;

removing the force from the mold members and further cooling the glass and the mold members; and moving the mold members to their open positions to permit removal of the molded glass.

27. A method of molding glass having a softening temperature within the range of 700°C to 800°C and an annealing temperature within the range of 600°C to 700°C, comprising the steps of:

providing a set of mold assemblies which are movable between an open and closed position and which include molding surfaces of glasslike carbon that define a mold cavity when the mold assemblies are in their closed position, the glasslike carbon being a form of carbon which has been prepared by the thermal degradation of an organic polymer, which is substantially chemically inert with heated glass and which is isotropic;

placing the mold assemblies within a chamber that may be substantially hermetically sealed;

placing glass between the molding surfaces;

hermetically sealing and evacuating the chamber;

heating the mold assemblies to a temperature within the range of 200°C to 300°C to outgas the mold members;

adding a gas of 95% $N_2$ and 5% $H_2$ to the chamber and maintaining the gas under a slight overpressure;

heating the mold assemblies to a temperature within the range of from 700°C to 800°C;

moving the mold assemblies towards their closed position and holding the molding surfaces in proximity with the glass for one to five minutes;

moving the mold assemblies toward their closed position until the molding surfaces are brought into contact with the glass;

adding a load of from 10 pounds to 200 pounds to the mold assemblies to press the glass into the shape of the mold cavity defined by the molding surfaces and maintaining the load for one minute;

cooling the mold assemblies to between 500°C and 600°C while maintaining a load on the mold assemblies;

removing the load from the mold assemblies and reducing the temperature of the mold assemblies to below 300°C;

unsealing the chamber; and moving the mold assemblies to their open position to permit removal of the molded glass.

* * * * *